United States Patent [19]
Schwendemann et al.

[11] Patent Number: 5,086,656
[45] Date of Patent: Feb. 11, 1992

[54] METHOD AND APPARATUS FOR CALCULATING THE AXLE LOAD OF A VEHICLE

[75] Inventors: Bernhard Schwendemann, Schorndorf; Werner Stumpe, Stuttgart, both of Fed. Rep. of Germany

[73] Assignee: Robert Bosch GmbH, Stuttgart, Fed. Rep. of Germany

[21] Appl. No.: 504,292

[22] Filed: Apr. 4, 1990

[30] Foreign Application Priority Data

Apr. 13, 1989 [DE] Fed. Rep. of Germany ....... 3912144

[51] Int. Cl.5 .......................... G01L 5/00; G01G 19/08
[52] U.S. Cl. .................... 73/862.54; 73/11; 177/137
[58] Field of Search ............ 73/11, 580, 862.54; 177/136, 137, 185, 210 FP; 340/440, 438, 666

[56] References Cited

U.S. PATENT DOCUMENTS

| | | | |
|---|---|---|---|
| 2,305,783 | 12/1942 | Heymann et al. | 73/580 |
| 3,648,790 | 3/1972 | Bishop | 177/137 |
| 4,086,576 | 4/1978 | Jebb et al. | 340/440 |
| 4,770,261 | 9/1988 | Yamahaka | 177/185 |
| 4,845,975 | 7/1989 | Kyrtsos et al. | 73/11 |

FOREIGN PATENT DOCUMENTS

| | | | |
|---|---|---|---|
| 0014025 | 1/1987 | Japan | 177/136 |
| 0731450 | 4/1980 | U.S.S.R. | 340/666 |

Primary Examiner—Charles A. Ruehl
Attorney, Agent, or Firm—Kenyon & Kenyon

[57] ABSTRACT

A method and apparatus for calculating the axle load on a motor vehicle having at least one axle, wherein the axle is coupled to the vehicle body, or the like, by a spring assembly. The frequency of the vibrations of the vehicle body opposite the axle that occur when driving are measured. The frequency measurements are in turn used to calculate a first axle load. A second axle load is calculated based on the displacement of the vehicle body relative to the axle due to the axle load. The first and second axle loads are evaluated to calculate a final axle load.

20 Claims, 2 Drawing Sheets

METHOD AND APPARATUS FOR CALCULATING THE AXLE LOAD OF A VEHICLE

FIELD OF THE INVENTION

The present invention relates to motor vehicles and, in particular, to methods and apparatus for calculating the axle load of a motor vehicle.

BACKGROUND INFORMATION

It is often necessary to calculate the axle load of a motor vehicle to control the operation of the vehicle and/or regulate the vehicle's chassis under varying loads. Known measuring devices for calculating axle loads typically base the calculation on the deflection path of the axle spring assembly in relation to the vehicle's chassis. The measuring devices in turn generate output signals indicative of the deflection.

One problem with such known measuring devices, is that the output signals frequently provide inaccurate deflection measurements. The spring assembly mounted between the axle and the chassis often settles and, as a result, a shift in the zero deflection position occurs. The axle load calculation can therefore correspondingly drift over time.

One approach to this problem is to calibrate the measuring device at regular intervals to achieve long-term stabilization. However, accurate calibration requires special workshop facilities and trained personnel, and is therefore a relatively expensive procedure.

It is an object of the present invention, therefore, to overcome the problems of known methods and apparatus for calculating the axle loads of motor vehicles.

SUMMARY OF THE INVENTION

The present invention is directed to a method for calculating the axle load of a motor vehicle. The motor vehicle has at least one axle coupled to the vehicle body by a spring assembly. The method comprises the following steps: measuring the frequency of the vibrations of the portion of the vehicle body adjacent to the axle; and calculating a first axle load based on the measured frequency. The method of the present invention preferably further comprises the steps of calculating a second axle load based on a measurement indicative of the displacement of the vehicle body relative to the axle due to the axle load; and comparing the first axle load calculation to the second axle load calculation to determine a final axle load.

In one method of the present invention, the second axle load calculation is based on the deflection path of the spring assembly due to the axle load. In another method of the present invention, the second axle load calculation is based on the measured deformation of a vehicle component caused by the axle load. In another method of the present invention, the second axle load calculation is based on the measured gas pressure of a pneumatic spring member coupled between the vehicle body and the axle.

In one method of the present invention, the final axle load is based on the average value of the first and second axle load calculations. The final axle load can also be based on a variably weighted average value of the first and second axle load calculations. In another method of the present invention, the final axle load is equal to the first axle load calculation corrected based on the value of the second axle load calculation, or is equal to the second axle load calculation corrected based on the value of the first axle load calculation.

One method of the present invention further comprises the steps of calculating the difference between the first axle load and the second axle load; comparing the value of the difference to a predetermined value; and generating an error signal if the value of the difference exceeds the predetermined value.

Another method of the present invention further comprises the steps of calculating a second axle load based on a measurement indicative of the displacement of the vehicle body relative to the axle due to the axle load; substantially instantaneously regulating the vehicle body while driving, based on the value of the second axle load; and calibrating the vehicle body regulating system based on the value of the first axle load.

The present invention is also directed to an apparatus for calculating the axle load of a motor vehicle. The motor vehicle has at least one axle supported from the vehicle body by a spring assembly. The apparatus comprises a measuring device coupled to the vehicle body. The measuring device generates output signals indicative of the frequency of the vibrations of the portion of the vehicle body adjacent to the axle. The apparatus further comprises first means coupled to the measuring device for calculating a first axle load in response to the output signals generated by the measuring device. The output signals generated by the measuring device include a first component indicative of the vibrations of the portion of the vehicle body adjacent to the axle, and a second component indicative of the distance between a portion of the vehicle body and the axle.

In one apparatus of the present invention, the spring assembly includes at least one pneumatic support member coupled between the axle and the vehicle body. The measuring device is coupled to the pneumatic support member. The first component of the output signals generated by the measuring device are based on changes in the gas pressure of the pneumatic support member. The second component of the output signals are based on the average gas pressure of the pneumatic support member.

In one apparatus of the present invention, the first means includes a first evaluating unit coupled to the measuring device to receive output signals generated therefrom. The first evaluating unit generates output signals indicative of a first axle load calculation. The first axle load calculation is based on the first component of the output signals of the measuring device. A second evaluating unit is also coupled to the measuring device to receive the output signals generated therefrom. The second evaluating unit generates output signals indicative of a second axle load calculation. The second axle load calculation is based on the second component of the output signals.

Another apparatus of the present invention further comprises second means coupled to the first evaluating unit and to the second evaluating unit. The second means generates output signals thereto indicative of the characteristic curve of the spring assembly of the vehicle. The first evaluating unit and second evaluating unit in turn generate output signals indicative of a first axle load calculation and a second axle load calculation, respectively, based thereon.

An apparatus of the present invention further comprises third means coupled to the first evaluating unit and to the second evaluating unit. The third means receives the output signals generated therefrom, and generates output signals in response thereto indicative of a final axle load calculation.

In one apparatus of the present invention, the output signals generated by the third means are based on a weighted average of the output signals of the first evaluating unit and the second evaluating unit, respectively. In another apparatus of the present invention, the output signals generated by the third means are based on the output signals of the first evaluating unit corrected based on the output signals of the second evaluating unit. The output signals generated by the third means can also be based on the output signals of the second evaluating unit, corrected based on the output signals of the first evaluating unit.

One advantage of the present invention is that because the first calculation of the axle load is based on a dynamic frequency measurement, it is independent of the change in a reference value, such as a shift in the zero deflection position due settling of the axle spring assembly.

It should be noted that with an electronic determination, the axle load calculation depends primarily on the data corresponding to the magnitude of the axle load, as opposed to the absolute magnitude of the axle load. Therefore, reference point displacements, due to settling of the axle spring assembly, for example, do not influence the axle load calculation of the present invention. As a result, the problems normally encountered with long-term stabilization of the calculated axle loads do not occur.

Another advantage of the present invention, is that the two axle load calculations, each derived by a different procedure, are preferably subjected to an averaging function to make the final axle load calculation. The apparatus and method of the present invention, therefore, at least partially compensate for any errors made by the measuring device.

Yet another advantage of the present invention, is that faulty measurements are avoided by comparing the difference between the first axle load calculation and the second axle load calculation to a predetermined differential value. If that value is exceeded, an error signal is generated to avoid malfunctions. Another advantage of the present invention, is that the same sensor can be used to generate data for both the first and second axle load calculations.

Other advantages of the apparatus and method of the present invention will become apparent in view of the following detailed description and drawings taken in connection therewith.

DETAILED DESCRIPTION

Figure 1:
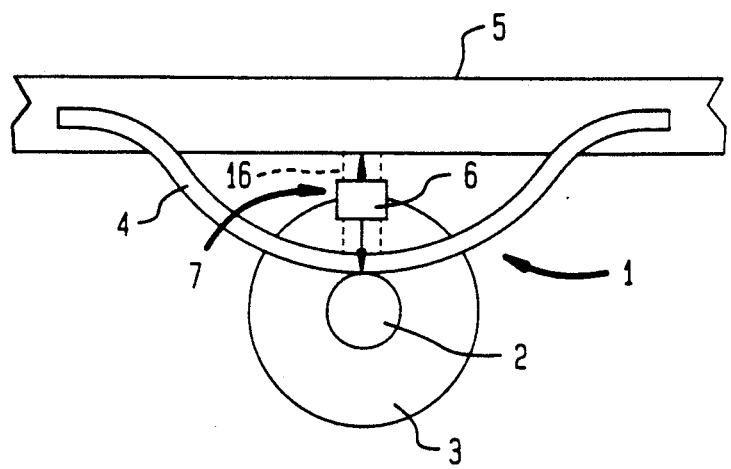
FIG. 1 is a schematic illustration of a motor vehicle chassis having a measuring device mounted thereon for calculating the axle load of the vehicle in accordance with the invention.

In FIG. 1, the undercarriage of a motor vehicle is indicated generally by the reference numeral 1. The vehicle includes an axle 2 having tires 3 mounted thereon (only one shown). The axle 2 is supported by a spring assembly 4 from the vehicle chassis 5. A measuring device 6, including a sensor 7, is supported between the chassis 5 and the axle 2. The sensor 7 generates output signals indicative of the position of the axle 2 relative to the chassis 5. A self-regulating potentiometer, of a type known to those skilled in the art, can be used as the sensor 7. The potentiometer can regulate itself based on the movement of the vehicle chassis 5 relative to the axle 2.

The distance between the axle 2 and the chassis 5 depends on several factors, including the weight of the vehicle and the movement of the axle 2 due to irregularities in the road surface. The deflection path of the spring assembly 4 is likewise dependent on several factors, such as the change in axle load when the vehicle's brakes are applied.

The output signals of the sensor 7 are therefore also dependent on several factors, including the vehicle load, the driving style (for example, abrupt handling verses smooth handling), the condition of the road surface, the conditions of the spring assembly 4, and the type of shock absorbers used (not shown) and their condition.

Figure 2:
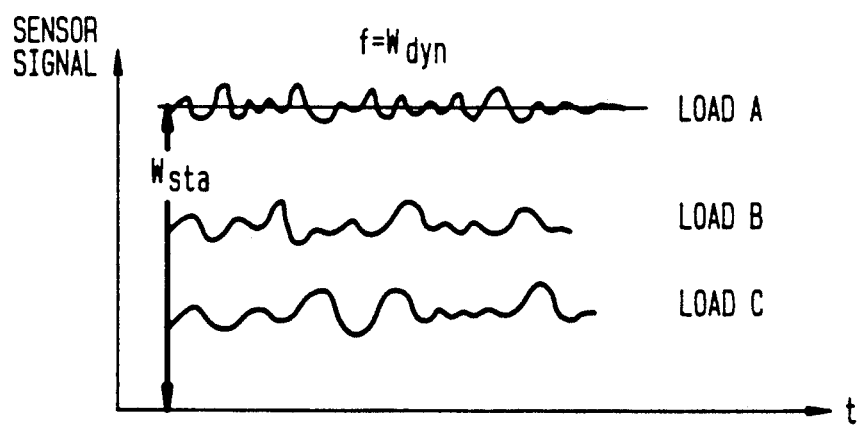
FIG. 2 is a graph illustrating the output data generated by the measuring device of FIG. 1 at different axle loads.

In FIG. 2, the signals generated by the sensor 7 are illustrated for three different vehicle loads, A, B and C, on the axle 2. The output signals generated by the sensor 7 at each axle load have a static component or value $W_{sta}$, and a dynamic component or value $W_{dyn}$. The static value $W_{sta}$ disregards the component of the respective curve due to vibrations. The dynamic value $W_{dyn}$, on the other hand, is equal to the frequency F of the respective curve.

Pursuant to the method and apparatus of the present invention, a first axle load calculation L is made based on the dynamic value $W_{dyn}$ of the output signals generated by the sensor 7. A second calculation of the axle load L is simultaneously made based on the static value $W_{sta}$ of the same output signals.

The frequency F ($F = W_{dyn}$) can be defined as follows:

$$F = \frac{1}{2\pi} \cdot [c/m]^{\frac{1}{2}} \quad (1)$$

where m is the mass of the vehicle body; and
c is the spring constant of the spring assembly 4, which is determined based on the construction of the undercarriage 1.

There is thus a known relationship between the frequency F and the mass m of each particular vehicle body. Because the mass m of the vehicle body is proportional to the load L on the axle 2, the frequency F can be used to calculate the load L. The load L is defined as follows:

$$L = m \cdot g \quad (2)$$

where g is the value of the acceleration due to gravity.

Therefore, by measuring the frequency F of the vibrations between the chassis 5 and the axle 2 with the sensor 7, the axle load L can be calculated based on equations (1) and (2).

The second axle load calculation (based on the static value $W_{sta}$) is made by first filtering-out the vibrational component of the output signals generated by the sensor 7. The output signals are indicative of the deflection of the spring assembly 4, and are therefore proportional to the mass m of the vehicle body. The larger the magnitude of the axle load L, the larger is the magnitude of the deflection path of the axle 2 relative to the chassis 5. The load L on the axle 2 can therefore be defined as follows:

$$L = c \cdot s \tag{3}$$

where c is the spring constant of the spring assembly 4; and s is the spring deflection path of the vehicle chassis 5 relative to the axle 2, as indicated by the filtered output signals of the sensor 7.

The static value $W_{sta}$ is measured with reference to an intermediate level of the vehicle chassis 5 relative to the axle 2; the dynamic value $W_{dyn}$ is indicative of the drift of the chassis 5 at a part level. The term "static," however, is not meant to be construed as "temporarily constant." Rather, the static value $W_{sta}$ can change rapidly. For example, when a moving vehicle's brakes are applied, the static value $W_{sta}$ can change quickly and dramatically. The dynamic value $W_{dyn}$, on the other hand, is indicative of the drift of the vehicle body at a particular static level.

Figure 3:
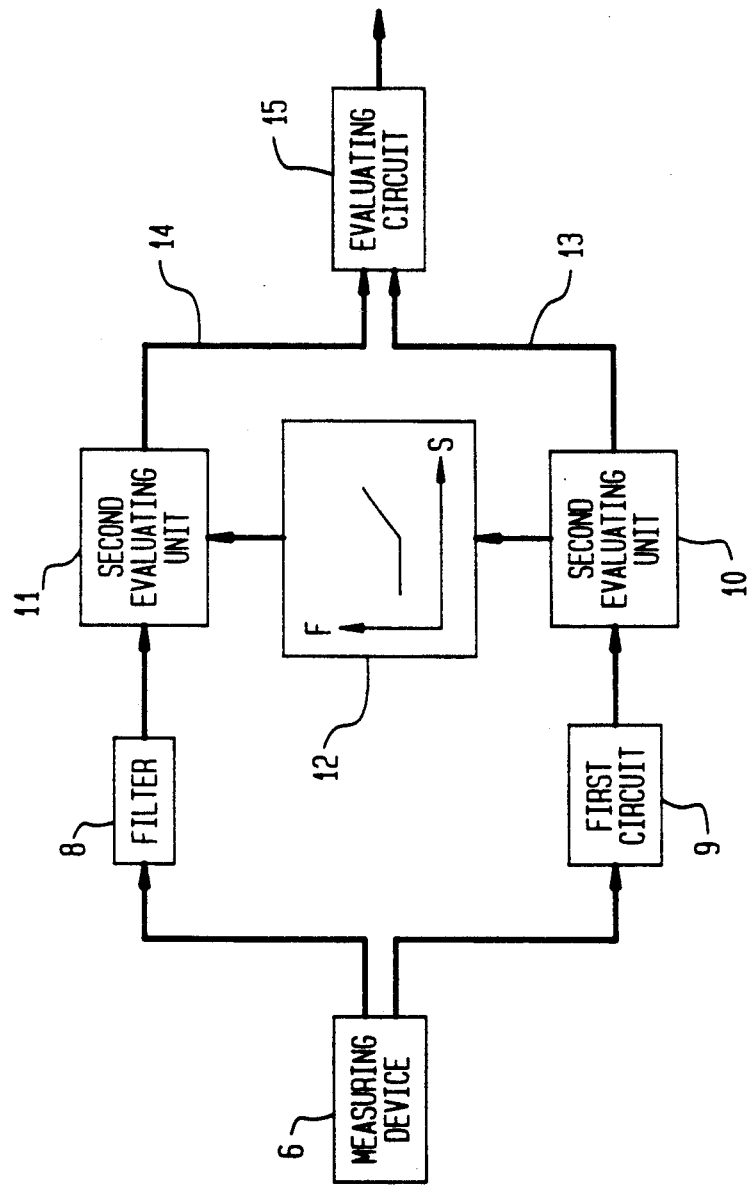
FIG. 3 is a block diagram of an apparatus embodying the present invention for calculating the axle load of a motor vehicle.

The calculation of an axle load L in accordance with the present invention is hereinafter described with reference to FIG. 3. As described above, the sensor 7 of the measuring device 6 generates output signals indicative of the position ($W_{sta}$) and the movement ($W_{dyn}$) of the vehicle chassis 5 at that position relative to the axle 2. The output signals of the measuring device 6 are transmitted to a filter 8 and to a first circuit 9. The vibrational components of the output signals are filtered-out in the filter 8. The first circuit 9, on the other hand, performs a frequency analysis on the output signals, in a manner known to those skilled in the art.

The first circuit 9 is coupled to a first evaluating unit 10, and the filter 8 is coupled to a second evaluating unit 11, both of a type known to those skilled in the art. A second circuit 12, also of a type known to those skilled in the art, is coupled to both the first evaluating unit 10 and the second evaluating unit 11. The second circuit 12 supplies data to both evaluating units corresponding to the spring constant of the spring assembly 4.

The first evaluating unit 10 in turn generates output signals indicative of the first axle load calculation onto a first output line 13. The second evaluating unit 11 generates output signals indicative of the second axle load calculation onto a second output line 14. The first axle load calculation is made pursuant to the dynamic principles described above in relation to equations (1) and (2); whereas the second axle load calculation is made pursuant to the static principles described above in relation to equation (3).

Both output signals are in turn transmitted to an evaluating circuit 15, also of a type known to those skilled in the art. The evaluating circuit 15 compares the first and second axle load calculations, and then calculates a weighted average and/or corrects one calculation based on the value of the other, to calculate a final axle load. The evaluating circuit 15 also compares the difference between the two axle load calculations to a predetermined value. If the difference exceeds the predetermined value, then the evaluating circuit 15 generates an error signal.

One advantage of the method and apparatus of the present invention, is that because both the static value ($W_{sta}$) and the dynamic value ($W_{dyn}$) of the output signals generated by the sensor 7 are evaluated, an improved instantaneous axle load value, as well as long-term stabilization of the calculated axle load values can be achieved. Moreover, only a single measuring device 6 having a single sensor 7 is required.

It should be noted that the second calculation of the axle load can be based on the deformation of a component of the chassis 5 due to the axle load. The deformation of the component can be detected, for example, by using strain measuring strips (not shown) mounted to the component.

It is also possible to make the second calculation of the axle load by detecting the gas pressure of a pneumatic spring member 16 coupled between the axle and the chassis, as indicated in phantom in FIG. 1. The pneumatic spring member 16 thus performs both vehicle suspension and sensory functions. The spring suspension path can be determined based on the gas pressure of the pneumatic member. In such a case, the sensor 7 is coupled to the pneumatic member 16, and is a pressure sensor, of a type known to those skilled in the art.

The sensor 7 in turn generates output signals indicative of the gas pressure of the pneumatic member 16. The dynamic value $W_{dyn}$ of the output signals are indicative of fluctuation the gas pressure; whereas the static value $W_{sta}$ of the output signals are indicative of the average gas pressure. The pneumatic spring member 16 can be used in addition to, or in place of the steel spring suspension typically used in motor vehicles. The latter case is typically referred to as air suspension; each pneumatic spring member supports a proportional amount of the vehicle load.

The evaluation based on the dynamic measurements ($W_{dyn}$) is typically slower than the evaluation based on the static measurements ($W_{sta}$). However, if a change in axle load occurs when braking the vehicle, for example, the axle load based on the static measurements can be used to regulate the chassis and/or the braking of the vehicle. The axle load based on the dynamic measurements, on the other hand, can be used for long-term calibration of the measuring system. The residual deflections of the spring assembly 4, or other vehicle components, can thus be automatically taken into consideration without having to adjust the measuring device 6 during maintenance of the vehicle.

We claim:

1. A method for calculating the axle load of a motor vehicle, the vehicle having at least one axle coupled to the vehicle body by a spring assembly, comprising the following steps:
   generating a signal indicative of the distance between the vehicle body and said at least one axle, the signal including a static component and a dynamic component;
   measuring the frequency of the dynamic component of the signal; and calculating an axle load based on the measured frequency and the static component.

2. A method as defined in claim 1 wherein the axle load is calculated by the following steps:
   calculating a first axle load based on the measured frequency and a second axle load based on the static component of the signal; and
   comparing the first axle load calculation to the second axle load calculation to determine the axle load.

3. A method as defined in claim 2, wherein
   the axle load is based on the average value of the first and second axle load calculations.

4. A method as defined in claim 2, wherein
the axle load is based on a variably weighted average value of the first and second axle load calculations.

5. A method as defined in claim 2, wherein
the axle load is equal to the first axle load calculation corrected based on the value of the second axle load calculation.

6. A method as defined in claim 2, wherein
the axle load is equal to the second axle load calculation corrected based on the value of the first axle load calculation.

7. A method as defined in claim 2, further comprising the following steps:
calculating the difference between the first axle load and the second axle load;
comparing the value of the difference to a predetermined value; and
generating an error signal if the value of the difference exceeds the predetermined value.

8. A method as defined in claim 1, wherein
the signal is based on the measured deflection path of the spring assembly due to the axle load.

9. A method as defined in claim 1, wherein
the signal is based on the measured deformation of a vehicle component caused by the axle load.

10. A method as defined in claim 1, wherein
the signal is based on the measured gas pressure of a pneumatic spring member coupled between the vehicle body and said at least one axle.

11. A method for calculating the axle load of a motor vehicle, the vehicle having at least one axle coupled to the vehicle body by a spring assembly, comprising the following steps:
generating a signal indicative of the distance between the vehicle body and said of least one axle, the signal including a static component and a dynamic component;
measuring the frequency of the dynamic component of the signal;
calculating a first axle load based on the measured frequency and a second axle load based on the static component of the signal;
substantially instantaneously regulating the vehicle body while driving, based on the value of the second axle load; and
calibrating the vehicle body regulating system based on the value of the first axle load.

12. An apparatus for calculating the axle load of a motor vehicle having at least one axle supported from the vehicle body by a spring assembly, comprising:
a measuring device coupled to either the vehicle body or the spring assembly, the measuring device generating an output signal indicative of the distance between a portion of the vehicle body and said at least one axle, the signal including a static component and a dynamic component;
first means for generating a frequency signal indicative of the frequency of the dynamic component of the output signal; and
second means coupled to the first means for calculating an axle load in response to the frequency signal and the static component of the output signal.

13. An apparatus as defined in claim 12, the spring assembly including at least one pneumatic support member coupled between said at least one axle and the vehicle body, wherein
the measuring device is coupled to the pneumatic support member, and the dynamic component of the output signal is based on changes in the gas pressure of the pneumatic support member, and the static component of the output signal is based on the gas pressure of the pneumatic support member.

14. An apparatus as defined in claim 12, wherein the second means includes:
a first evaluating unit coupled to the first means to receive the frequency signal, the first evaluating unit generating a signal indicative of a first axle load calculation, the first axle load calculation being based on the frequency signal; and
a second evaluating unit including means for filtering coupled to the measuring device to receive the output signal and substantially filter out the dynamic component of the output signal, the second evaluating unit generating a signal indicative of a second axle load calculation, the second axle load calculation being based on the static component of the output signal.

15. An apparatus as defined in claim 14, further comprising:
third means coupled to the first evaluating unit and to the second evaluating unit for transmitting signals thereto indicative of the characteristic curve of the spring assembly of the vehicle, the first evaluating unit and second evaluating unit in turn generating signals indicative of a first axle load calculation and a second axle load calculation, respectively, based thereon.

16. An apparatus as defined in claim 15, further comprising:
fourth means coupled to the first evaluating unit and the second evaluating unit for receiving the signals generated therefrom and for generating signals in response thereto indicative of the axle load calculation.

17. An apparatus as defined in claim 16, wherein
the signals generated by the fourth means are based on a weighted average of the signals of the first evaluating unit and the second evaluating unit, respectively.

18. An apparatus as defined in claim 16, wherein
the signals generated by the fourth means are based on the signal of the first evaluating unit corrected based on the signal of the second evaluating unit, or are based on the signal of the second evaluating unit corrected based on the signal of the first evaluating unit.

19. A method for calculating the axle load of a motor vehicle, the vehicle having at least one axle coupled to the vehicle chassis by a spring assembly, comprising the following steps:
generating first signals indicative of the vibrational frequency of a portion of the vehicle chassis moving relative to said one axle;
calculating a first axle load based on the first signals;
generating second signals indicative of the displacement of the vehicle chassis relative to said one axle due to the axle load;
calculating a second axle load based on the second signals; and
calculating a third axle load based on the values of the first and second axle loads.

20. An apparatus for calculating the axle load of a motor vehicle, the vehicle having at least one axle coupled to the vehicle chassis by a spring assembly, comprising:

a measuring unit coupled to the chassis, the measuring unit generating signals indicative of the frequency of the vibrations of a portion of the chassis moving relative to said at least one axle and the distance between a portion of the chassis and said at least one axle;

first means coupled to the measuring unit to receive the signals generated therefrom for generating first signals indicative of a first axle load calculation based on the frequency of the vibrations of the portion of the chassis adjacent to said at least one axle;

second means coupled to the measuring unit to receive the signals generated therefrom for generating second signals indicative of a second axle load calculation based on the distance between a portion of the chassis and said at least one axle; and third means coupled to the first means and to the second means for receiving the first and second signals, respectively, therefrom, and for generating third signals indicative of a third axle load in response thereto.

* * * * *

UNITED STATES PATENT AND TRADEMARK OFFICE
CERTIFICATE OF CORRECTION

PATENT NO. : 5,086,656

DATED : February 11, 1992

INVENTOR(S) : B. Schwendemann, et al.

It is certified that error appears in the above-identified patent and that said Letters Patent is hereby corrected as shown below:

Column 7, line 14, change "load" to --load calculation based on the frequency--.

Column 7, line 15, change "load" to --load calculation based on the static component of the signals--.

Signed and Sealed this

Ninth Day of November, 1993

*Attest:*

BRUCE LEHMAN

*Attesting Officer*  *Commissioner of Patents and Trademarks*